Jan. 25, 1966  G. W. CHENEY  3,231,651
PLASTIC FILM WINDUP APPARATUS
Original Filed Jan. 3, 1961  2 Sheets-Sheet 1

INVENTOR.
Grant W. Cheney
BY
Dominik and Stein &
Jerome Ludix  att'ys.

Jan. 25, 1966 G. W. CHENEY 3,231,651
PLASTIC FILM WINDUP APPARATUS
Original Filed Jan. 3, 1961 2 Sheets-Sheet 2

INVENTOR.
Grant W. Cheney

# United States Patent Office 3,231,651
Patented Jan. 25, 1966

3,231,651
PLASTIC FILM WINDUP APPARATUS
Grant W. Cheney, Midland, Mich., assignor to The Dow Chemical Company, Midland, Mich., a corporation of Delaware
Original application Jan. 3, 1961, Ser. No. 80,153, now Patent No. 3,161,942, dated Dec. 22, 1964. Divided and this application Feb. 24, 1964, Ser. No. 346,793
4 Claims. (Cl. 264—146)

This application is a division of the co-pending application to Grant W. Cheney, filed January 3, 1961, Serial No. 80,153, now Patent No. 3,161,942, and entitled Plastic Film Windup Apparatus, and relates to a method and apparatus for uniformly distributing gauge variations of plastic extruded tubular film and sheeting on windup rolls. The apparatus for performing this operation is disclosed and claimed in the above-mentioned co-pending application.

It is found difficult, if not impossible, to extrude plastic film of uniform microscopic thickness. Accordingly, in winding up extruded plastic film on windup rolls, build-ups are caused which produce high spots. As such high spots increase in size, the film is caused to be stretched, which makes such film generally unuseable.

To avoid film spoilage which may be caused by such build-up, one solution has been to rotate the extrusion die, or the pinch rollers together with the winding means, about the axis of the tubing as it is being extruded from the die. By way of example of such practice, reference may be made to Patent No. 2,844,846, issued July 29, 1958.

The method and apparatus of the present invention represents an improvement over such known arrangements for plastic film windup. More particularly, the apparatus of the present invention is not only of simplified construction insofar as only the windup mechanism is rotated, but continuous slitting of an extruded tube for winding on two rolls is achieved at the same time. An important feature of the disclosed embodiments of the invention resides in the use of a tube spreading means which is positioned within an extruded tube, and is supported for rotation within the tube without causing twisting of the tube.

The main object of the present invention is to provide an improved method and apparatus for uniformly distributing gauge variations of plastic extruded tubular film and sheeting on windup rolls.

Another object of the present invention is to provide a method and apparatus for slitting a plastic tubular film in such manner as to achieve uniform distribution of gauge variations of the cut film on windup rolls.

These and further objects and features of the invention will become more apparent from the following description and accompanying drawings wherein.

Figures 1, 2:
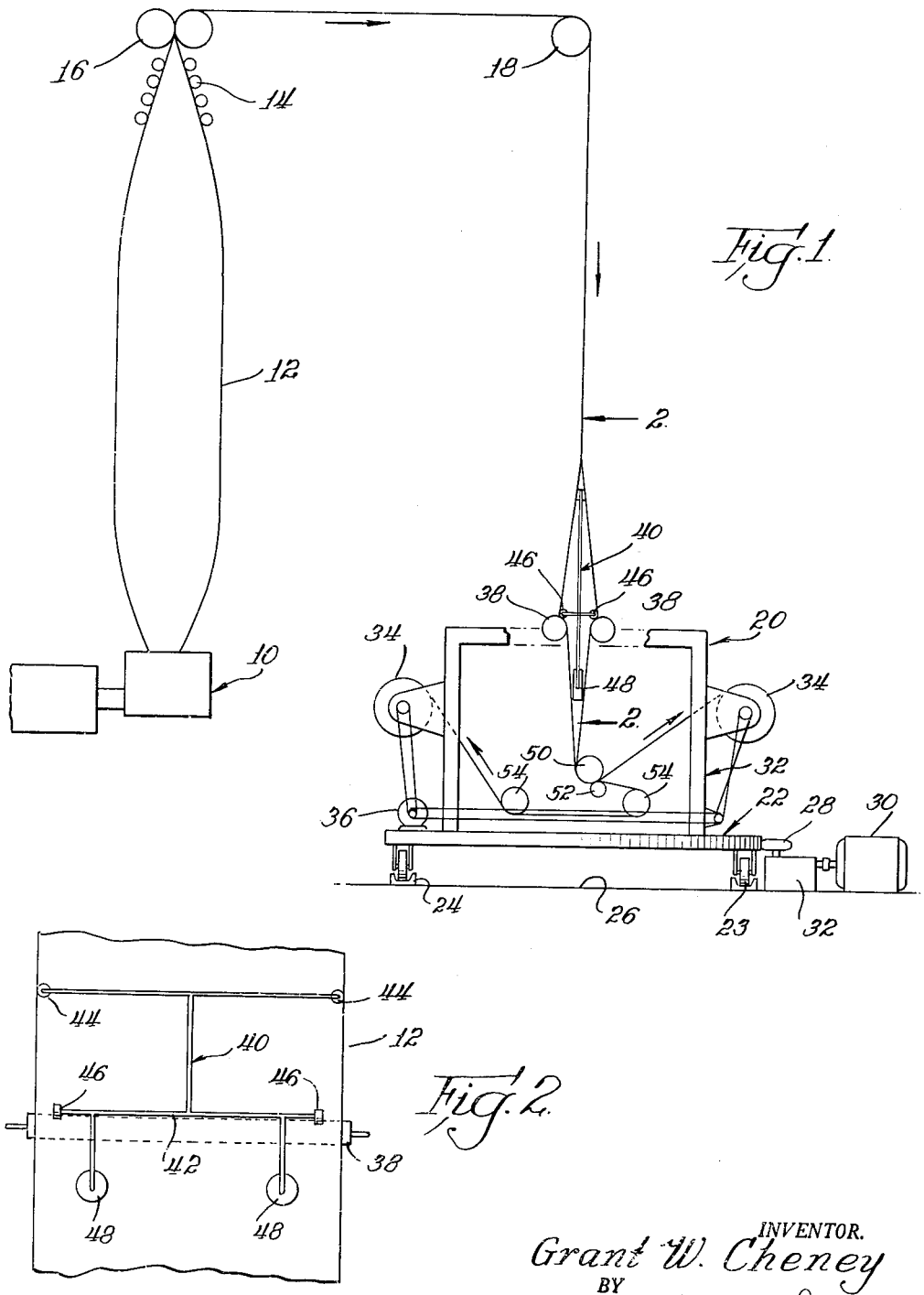
FIG. 1 is a schematic elevation view illustrating an arrangement incorporating the apparatus of the invention.
FIG. 2 is a view generally as seen along line 2—2 in FIG. 1.

Referring now to the drawing, and more particularly to FIGS. 1 and 2, the numeral 10 identifies the die head of apparatus designed to extrude a plastic tube 12, which is inflated by air to form an elongated bubble, as illustrated. A plurality of rollers 14 are arranged to cause flattening of the bubble, after which the flattened tube passes between a pair of pinch rollers 16 and over a guide roller 18. The axis of rollers 16 and 18 are fixed in parallel relation.

A windup assemblage 20 includes a circular turntable, or platform 22 mounted upon wheels 23, which run in a grooved circular track 24 supported upon the floor 26. A rubber drive wheel 28, frictionally engages the peripheral edge of the platform 22, said drive wheel being rotatable by an electric motor 30, connected to the wheel by suitable reduction gear mechanism 32. The motor 30 may be irreversible, or may be of the reversible type, in which event, switch means (not shown) should be provided to cause oscillating movement of the turntable 22 through a given number of degrees, and at a given rate of speed as required for satisfactory operation under specific conditions.

Mounted upon the turntable 22 is a frame means 32 adapted to removably support a pair of windup rolls 34 in parallel spaced relation. A motor means 36, is adapted to rotate said rolls 34 by suitable drive belt means as shown, whereby the rolls will be wound as required. Rotatably supported by the frame means 32, are parallel spaced rollers 38 between which the extruded tube 12 is arranged to pass. Positioned within the tube 12 is a floating spreader assemblage 40, which includes a frame means 42 supporting tube crease reforming rollers 44, two pair of rollers 46 adapted for rotation by virtue of contact with the rollers 38 through the tubing 12, and a pair of weight means 48. The weights 48 maintain the assemblage 40 in upright position within the tubing 12, and result in sufficient pressure between the rollers 46 and rollers 38, so that rotation of the rollers 38 in a horizontal plane, will cause rotation of the assemblage 40 within the tube 12 and without rotation of the tube. Such action will result in reforming of the two edge creases of the tube 12, whereby the new edge creases will be in spiral relationship to a fixed longitudinal centerline of the tube 12, before it passes the assemblage 40. In other words, the platform 22 and windup mechanism is rotated about the tubular film 12. A roller 50 is supported by the frame means 32, while a pair of trimming wheels 52 is arranged in abutment with the roller 50 for cutting the edges of the tube 12 to form two sheets, which are separately wound on the rolls 34. Rollers 54, supported by the frame means 32, are arranged to direct one of the cut sheets to a roller 34. If so desired, the cut sheets may be fed on only one roll, and also, the trimming wheels may be omitted so that the tube is wrapped in uncut condition.

It will be seen from the foregoing that as the turntable 22 is rotated, the reformed creases of the tube 12, developed by the floating spreader 40, will be severed by the trimming wheels 52, so that gauge variations in the sheets formed from the tubing will be distributed over the full width of a windup roll, and build-ups will be avoided.

Figure 3:
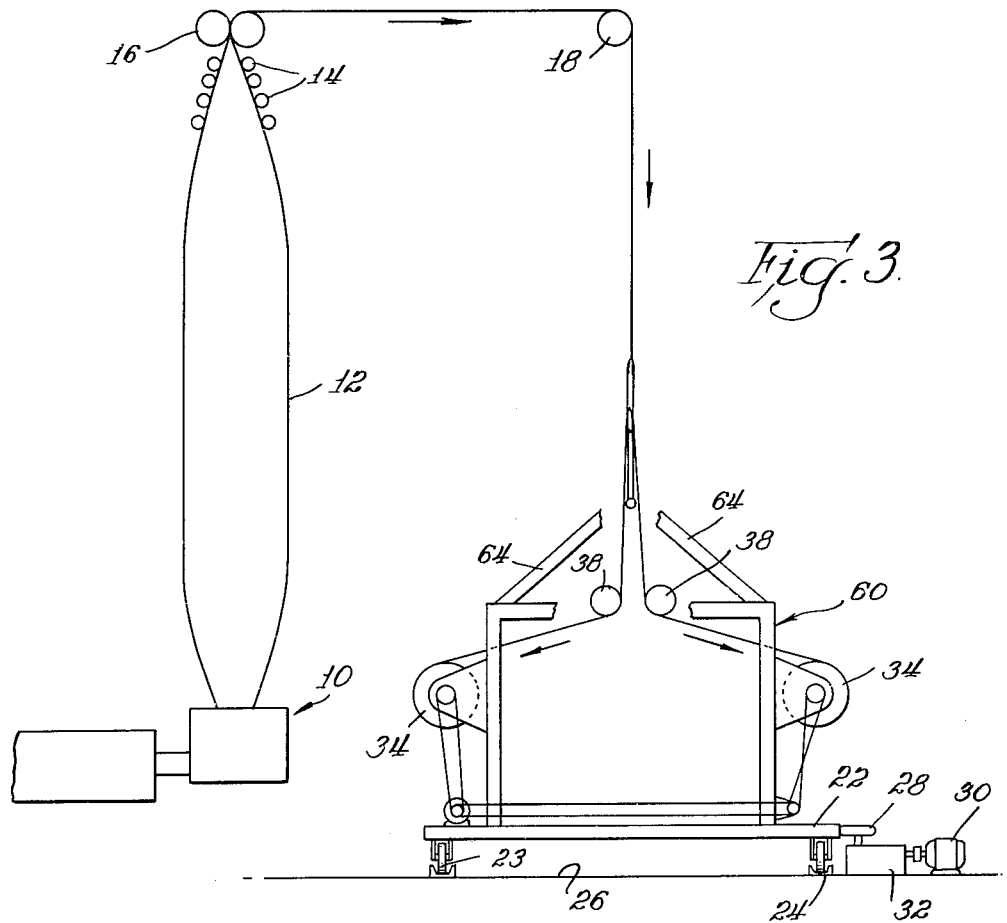
FIG. 3 is a view similar to FIG. 1, but showing a modified embodiment of the invention.
Figure 4:
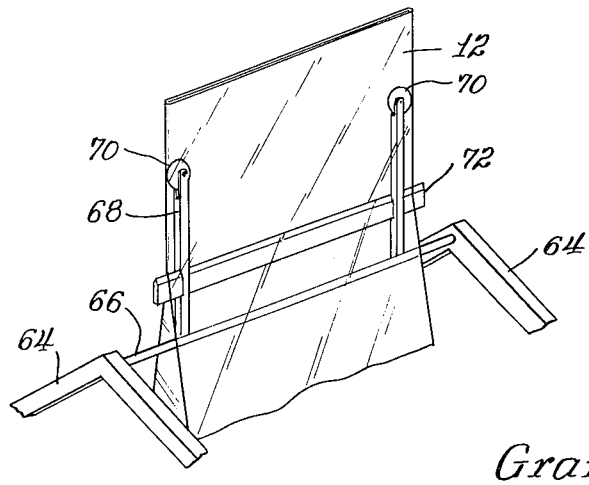
FIG. 4 is a fragmentary perspective view of a portion of the arrangement of FIG. 3.

A modified embodiment of a windup assemblage 60 of the invention is illustrated in FIGS. 3 and 4. For the sake of simplicity, the same numerals are used to identify like parts described in connection with the windup assemblage 20.

The windup assemblage 60 has a frame means 62 which differs mostly from the frame means 32, in that a pair of upright sloping braces 64 are provided, which support a rod 66 therebetween, as best seen in FIG. 4. The rod 66 supports a slitter assemblage including two pairs of upwardly extending arms 68, each of which support a wheel 70 adapted to engage a creased inner edge of the folded plastic tube 12, and to cause a reformation of the tube edge crease. A knife blade 72 is supported in horizontal position below the wheels 70, the ends of the knife blade extending beyond the edges of the tubing 12. The knife blade 72, severs the tubing into two sheets which are directed to the windup rolls 34. It will be seen that as the turntable 22 is rotated, the windup assemblage 60, will be rotated relative to the tubing 12, so that the knife blade 72 will cut the tubing along edges which are in spiral relation to a fixed longitudinal centerline of the tubing.

In such manner, any gauge variations of the tubing will be distributed over the full width of a windup roll, and build-ups will be avoided.

The invention has so far been illustrated with respect to the preparation of flat film sheet from tubular stock. There are uses for tubular film, however, and the spiral redistribution of gauge variation herein described is as advantageous in preparing level wound rolls of uncut, flattened tubular film as in the described preparation of flat sheets. In applying the invention to such purpose, an apparatus embodying the principles shown in FIG. 1 is used, but the trimming wheels 52 are disengaged from the flattened tube supply, and the product is wound on a single roll 34.

From the foregoing it will be seen that the described embodiments will meet the objectives of the invention as hereinbefore set forth.

The foregoing description has been given in detail without thought of limitation since the inventive principles involved are capable of assuming other forms without departing from the spirit of the invention or the scope of the following claims.

I claim:

1. A method for uniformly distributing gauge variations of plastic extruded film on windup rolls wherein extruded tubular film is flattened to provide creased edges comprising the steps of reforming the creased edges spirally relative to a fixed longitudinal axis of the flattened tube, and winding up the so affected film on roll means.

2. A method for uniformly distributing gauge variations of plastic extruded film on windup rolls wherein the extruded film is flattened to provide creased edges comprising the steps of, reforming the creased edges spirally relative to a fixed longitudinal axis of the flattened film, cutting the reformed creased edges, and winding the film sheets thus provided upon separate windup rolls.

3. A method for uniformly distributing gauge variations of plastic extruded film on windup rolls wherein extruded tubular film is flattened to provide creased edges comprising the steps of, inserting a floating spreader assemblage within the creased film, providing a rotatably windup roller assembly on which the film is wound, providing roller means of the windup roller assembly which cooperate with the floating spreader assemblage to reform the creased edges of the film spirally relative to a fixed longitudinal axis of the flattened film, and winding up the so affected film on roll means on the windup roller assembly as the same is rotated.

4. A method for uniformly distributing gauge variations of plastic extruded film on windup rolls wherein extruded tubular film is flattened to provide creased edges comprising the steps of, inserting a floating spreader assemblage within the creased film, providing a rotatably windup roller assembly on which the film is wound, providing roller means of the windup roller assembly which cooperate with the floating spreader assemblage to reform the creased edges of the film spirally relative to a fixed longitudinal axis of the flattened film, cutting the reformed creased edges, and winding up the so affected film on roll means on the windup roller assembly as the same is rotated.

References Cited by the Examiner

UNITED STATES PATENTS

| 2,844,846 | 7/1958 | Kronholm | 18—14 |
| 2,923,194 | 2/1960 | Ambler et al. | 18—14 |
| 3,059,548 | 10/1962 | Kaplan et al. | 18—14 XR |

FOREIGN PATENTS

| 203,916 | 1/1956 | Australia. |

ROBERT F. WHITE, *Primary Examiner.*